(12) United States Patent
Choi et al.

(10) Patent No.: US 8,078,179 B2
(45) Date of Patent: Dec. 13, 2011

(54) MOBILITY SUPPORTING METHOD OF MOBILE TERMINAL BASED ON PREFIX BINDING AND MOBILITY SUPPORTING SYSTEM USING THE METHOD

(75) Inventors: Jin-Hyeock Choi, Yongin-si (KR); Hee-Jin Jang, Yongin-si (KR); Young Don Chung, Suwon-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 1172 days.

(21) Appl. No.: 11/878,827

(22) Filed: Jul. 27, 2007

(65) Prior Publication Data

US 2008/0089301 A1 Apr. 17, 2008

Related U.S. Application Data

(60) Provisional application No. 60/851,295, filed on Oct. 13, 2006.

(30) Foreign Application Priority Data

Nov. 23, 2006 (KR) .................. 10-2006-0116439

(51) Int. Cl.
*H04W 40/00* (2009.01)
(52) U.S. Cl. ....................... 455/445; 370/351
(58) Field of Classification Search .............. 455/445, 455/436; 370/238, 351
See application file for complete search history.

(56) References Cited

U.S. PATENT DOCUMENTS

| | | | |
|---|---|---|---|
| 6,763,007 | B1 | 7/2004 | La Porta et al. |
| 7,039,404 | B2 | 5/2006 | Das et al. |
| 2001/0046223 | A1 | 11/2001 | Malki et al. |
| 2005/0190734 | A1 | 9/2005 | Khalil et al. |
| 2006/0080728 | A1* | 4/2006 | Wen et al. ................ 726/4 |
| 2007/0189219 | A1* | 8/2007 | Navali et al. .......... 370/331 |
| 2007/0248062 | A1* | 10/2007 | Leung et al. .......... 370/338 |

FOREIGN PATENT DOCUMENTS

| | | |
|---|---|---|
| JP | 2005-252720 | 9/2005 |
| KR | 10-2005-0040180 | 5/2005 |
| KR | 10-2005-0046499 | 5/2005 |
| KR | 10-2005-0050455 | 5/2005 |
| KR | 1020050040180 | 5/2005 |
| KR | 1020050046499 | 5/2005 |
| KR | 1020050050455 | 5/2005 |
| KR | 10-2005-0065127 | 6/2005 |
| KR | 1020050065127 | 6/2005 |
| KR | 10-2006-0023670 | 3/2006 |
| KR | 1020060023670 | 3/2006 |
| KR | 10-2006-0058831 | 6/2006 |
| KR | 10-2006-0068529 | 6/2006 |
| KR | 1020060058831 | 6/2006 |
| KR | 1020060068529 | 6/2006 |

* cited by examiner

*Primary Examiner* — Rafael Pérez-Gutiérrez
*Assistant Examiner* — Marcos Batista
(74) *Attorney, Agent, or Firm* — NSIP Law

(57) ABSTRACT

A mobility supporting method and a mobility supporting system using the method are provided. The mobility supporting method includes a first access router for allocating a prefix to a mobile terminal, and registering the allocated prefix in an authentication server when the mobile terminal connects to the first access router. There is also the authentication server for verifying the mobile terminal based on the registered prefix, and reporting a result of the verifying of the mobile terminal to a second access router when the mobile terminal moves to connect to the second access router and the second access router for notifying the reported result of the verifying the mobile terminal to the first access router.

20 Claims, 6 Drawing Sheets

MOBILITY SUPPORTING METHOD OF MOBILE TERMINAL BASED ON PREFIX BINDING AND MOBILITY SUPPORTING SYSTEM USING THE METHOD

CROSS-REFERENCE TO RELATED APPLICATION

This application claims the benefit under 35 U.S.C. §119 (e) of U.S. Provisional Application No. 60/851,295, filed on Oct. 13, 2006, in the U.S. Patent and Trademark Office, and under 35 U.S.C. §119(a) of Korean Patent Application No. 10-2006-0116439, filed on Nov. 23, 2006, in the Korean Intellectual Property Office, the entire disclosure of both of which are hereby incorporated by reference.

BACKGROUND OF THE INVENTION

1. Field of the Invention

The following description relates to a wireless network. More particularly, the following description relates to a mobility supporting method based on prefix binding which can effectively support the mobility of a mobile terminal, and a mobility supporting system using the method.

2. Description of Related Art

Demands for a personal digital assistant (PDA), and a smart phone, among others, combining a function of a mobile phone with a function of a personal computer (PC), will be dramatically increased, and a mobile communication network technology and a wireless LAN technology will be greatly developed due to improvements in data processing speed in the near future. With the development of wireless technology, the number of wireless terminals capable of supporting mobility will continually increase.

A mobile Internet protocol (IP) of an Internet engineering task force (IETF) has standardized Internet protocol version 6 (IPv6) as a mobility supporting standard. The mobile IP is generally divided into a mobile IPv4 for an Internet protocol version 4 (IPv4) network and a mobile IPv6 for an IPv6 network, and the mobile IPv4 is considered to be inappropriate for a future communication environment since the mobile IPv4 uses an IPv4 addressing system. Accordingly, the mobile IPv6 is generally considered to be a more desirable mobility supporting method based on an IP network.

The mobile IPv6 is a protocol which allows a mobile terminal to communicate with other terminals without a break of logical connections even when the mobile terminal moves to a new link by moving out of its own home link on an IPv6 Internet.

However, the mobile IPv6 has problems. These problems include the fact that frequent movements of the mobile terminal cannot be adequately supported, and a real-time service application cannot be adequately supported using only the mobile IPv6 terminal, since the mobile IPv6, i.e. one of mobility supporting methods on a wireless network according to a conventional art, only supports a general and widespread mobility.

Accordingly, there is a need for an improved system and method for more effectively supporting the mobility of a mobile terminal in a wireless network.

SUMMARY OF THE INVENTION

The following description relates to providing a mobility supporting method and a mobility supporting system using the method which can effectively support a mobility of a mobile terminal on a wireless network by allocating, with an access router, a prefix to each of the mobile terminals, and supporting the mobility of the mobile terminal based on the allocated prefix.

In one general aspect, a mobility supporting method is provided. A first access router allocates a prefix to a mobile terminal. The allocated prefix is registered in an authentication server when the mobile terminal connects to the first access router. The authentication server verifies the mobile terminal based on the registered prefix, and reports a result of the verification of the mobile terminal to a second access router when the mobile terminal moves to connect to the second access router. The second access router notifies the reported result of the verification of the mobile terminal to the first access router.

In another general aspect, a mobility supporting system is provided that includes an authentication server, a first access router and a second access router. The authentication server stores registration information to manage the registration information which corresponds to a mobile terminal in an authentication prefix list. The first access router allocates a prefix to the mobile terminal and registers the allocated prefix in the authentication server when the mobile terminal connects to the first access router. The second access router verifies the mobile terminal via the authentication server and reports the mobile terminal and connects to a second access router.

Other features and aspects may be apparent from the following detailed description, the drawings, and the claims.

BRIEF DESCRIPTION OF THE DRAWINGS

Throughout the drawings, the same drawing reference numerals will be understood to refer to the same elements, features and structures.

DETAILED DESCRIPTION

The following description is provided to assist the reader in gaining a comprehensive understanding of the methods, apparatuses, and/or systems described herein. Accordingly, various changes and modifications of the methods, apparatuses, and/or systems described herein described herein will be suggested to those of ordinary skill in the art. Also, descriptions of well-known functions and constructions may be omitted for increased clarity and conciseness.

It is assumed that a mobile terminal, according to one general aspect, may be realized into any of a mobile communication terminal, a public switched telephone network (PSTN) terminal, a voice over Internet protocol (VoIP), a session initiation protocol (SIP) terminal, a media gateway controller (Megaco) terminal, a personal digital assistant (PDA), a cellular phone, a personal communication service (PCS) phone, a hand-held personal computer (PC), a code division multiple access (CDMA)-2000 (1X, 3X) phone, a wideband CDMA (WCDMA) phone, a dual band/dual mode phone, a global system for mobile communication (GSM) phone, a mobile broadband system (MBS) phone, or a satellite/terrestrial digital multimedia broadcasting (DMB) phone.

Figure 1:
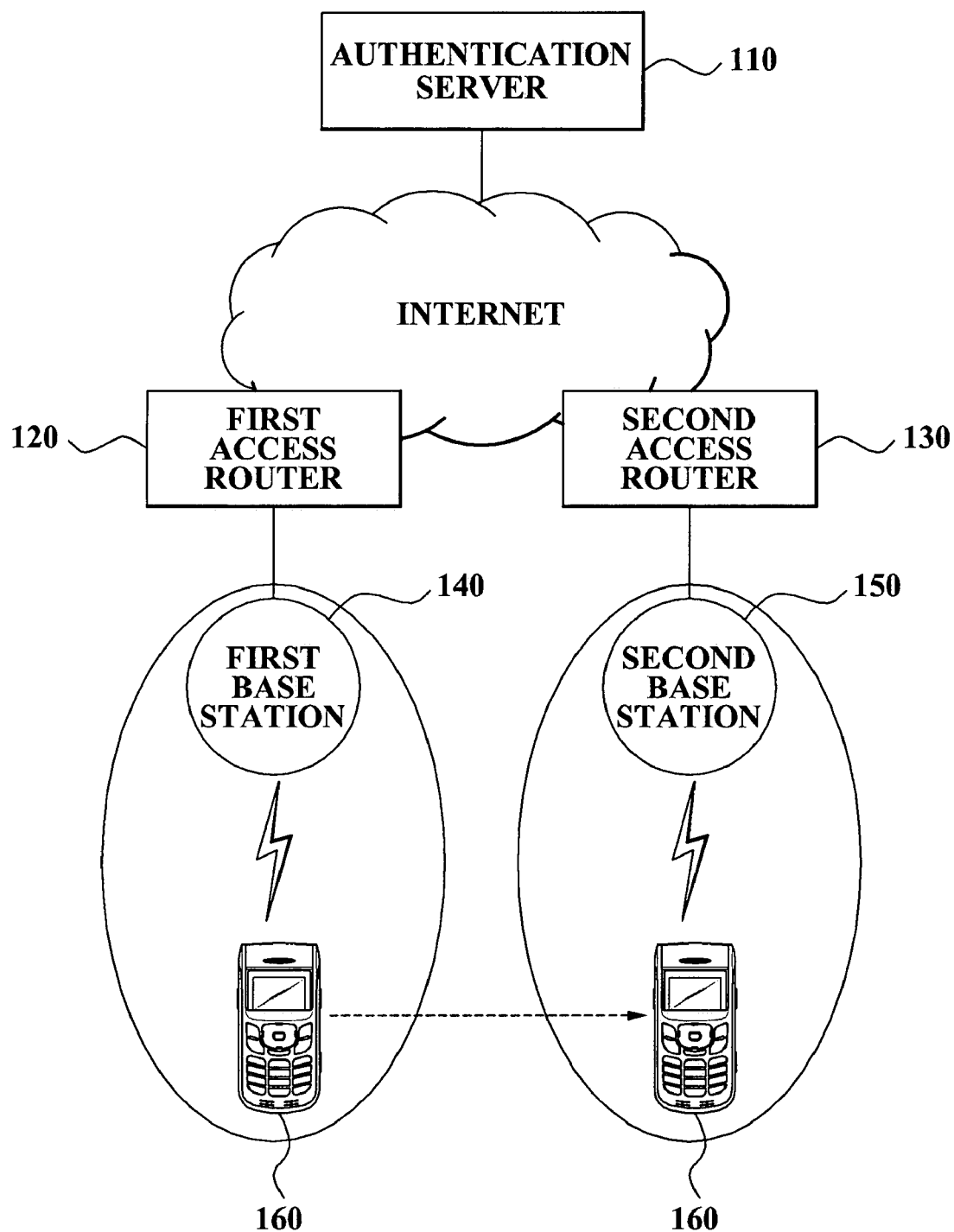
FIG. 1 is an example of a configuration diagram illustrating a mobility supporting system of a mobile terminal based on a prefix binding.

FIG. 1 is an example of a configuration diagram illustrating a mobility supporting system of a mobile terminal 160 based on a prefix binding.

As illustrated in FIG. 1, the mobility supporting system of the mobile terminal 160 based on the prefix binding, according to a general aspect, may include an authentication server 110, a first access router 120, a second access router 130, a first base station 140, a second base station 150, and the mobile terminal 160.

The mobility supporting system of the mobile terminal 160 based on the prefix binding, according to a general aspect, will be described.

The authentication server 110 may store information of the mobile terminal 160 to manage information of the mobile terminal 160, and be connected to the first access router 120 and the second access router 130. The system may provide that an identification (ID) allocated with a prefix of the mobile terminal 160, the allocated prefix, and an IP address of an access router used to allocate the prefix are stored.

The system may provide that the authentication server 110 includes an authentication, authorization, and accounting (AAA) server capable of performing as a subscriber server, and capable of performing functions such as authentication, authorization, and accounting.

The first access router 120 may allocate the prefix to the mobile terminal 160, register the allocated prefix in the authentication server 110, and store the information of the mobile terminal 160 in a first prefix list to manage the information of the mobile terminal 160, when the mobile terminal 160 connects to the first access router 120 via the first base station 140. For example, an ID of the mobile terminal 160 and information of the prefix may be stored.

When the mobile terminal 160 connects to the second access router 130 via the second base station 150, the second access router 130 may verify information of the mobile terminal 160, report that the mobile terminal 160 is connected to the first access router 120, receive a data packet which was received in the first access router 120, and transmit the received data packet to the mobile terminal 160.

The system may provide that the second access router 130 stores the information of the mobile terminal 160 in a second prefix list to manage the information of the mobile terminal 160. For example, the ID of the mobile terminal 160 and the information of the prefix may be stored.

The system may also provide that the first access router 120 and the second access router 130 include access routers capable of performing a function of a Network Mobility (NEMO) home agent.

The mobile terminal 160 may be allocated with the prefix from the first access router 120 when connecting to the first access router 120. When the mobile terminal 160 moves from a service area of the first access router 120 to a service area of the second access router 130, and connects to the second access router 130, the data packet from the second access router 130 may be transmitted to the mobile terminal 160. This data packet would have been received in the first access router 120.

Figure 2:
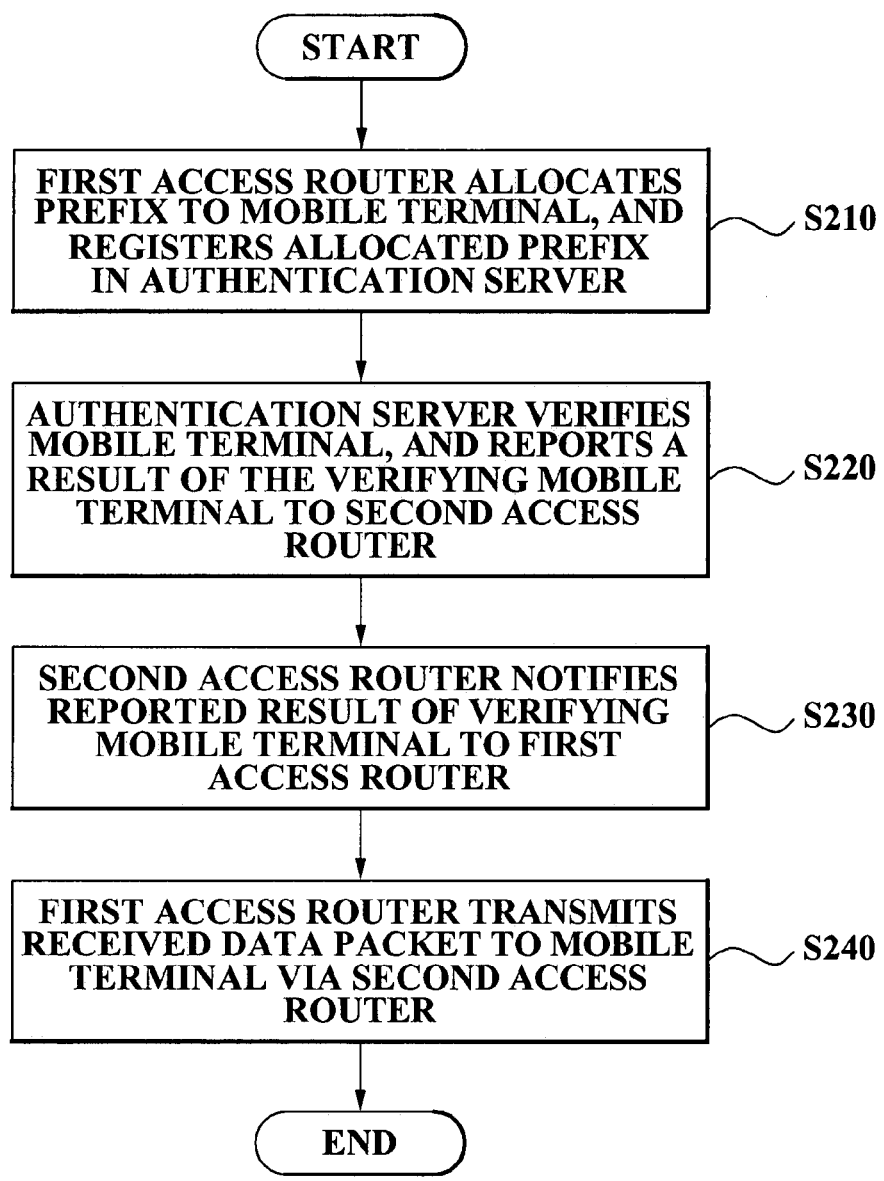
FIG. 2 is an example of a flowchart illustrating a mobility supporting method of the mobile terminal based on a prefix binding.

FIG. 2 is an example of a flowchart illustrating a mobility supporting method of the mobile terminal 160 of FIG. 1 based on a prefix binding.

As illustrated in FIG. 2, the mobility supporting method of the mobile terminal 160 based on the prefix binding according to a general aspect may include registering in operation S210, reporting in operation S220, notifying in operation S230, and transmitting in operation S240.

The mobility supporting method of the mobile terminal 160 based on the prefix binding according to a general aspect will be described in detail.

In step S210, when the mobile terminal 160 connects to the first access router 120, the first access router 120 may allocate a prefix to the mobile terminal 160, and register the allocated prefix in the authentication server 110.

In step S220, when the mobile terminal 160 moves to the second access router 130, the authentication server 110 may verify the mobile terminal 160, and report a result of the verifying of the mobile terminal 160 to the second access router 130.

In step S230, the second access router 130 may notify the reported result of the verifying of the mobile terminal 160 to the first access router 120.

Finally, in step S240, when the first access router 120 receives a data packet, the first access router 120 may transmit the received data packet to the mobile terminal 160 via the second access router 130. The above mentioned operations will be described by referring to FIGS. 3 through 6.

Figure 3:
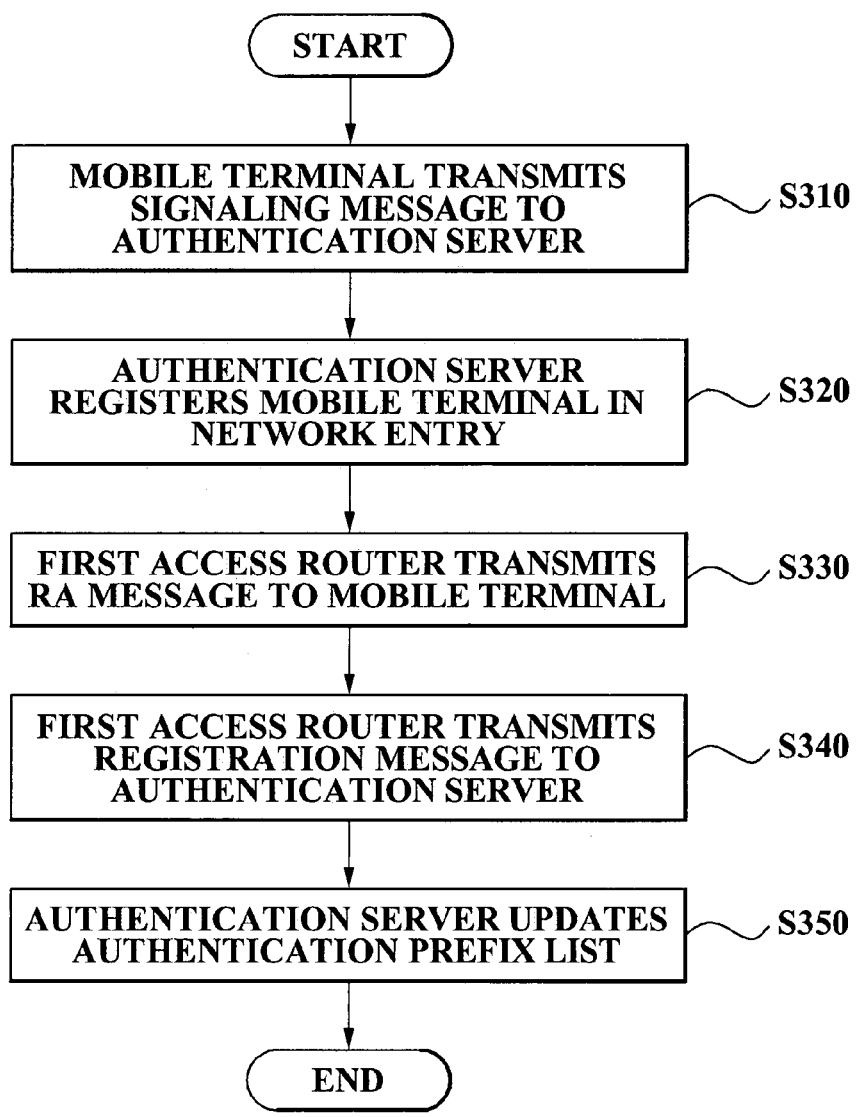
FIG. 3 is an example of a flowchart illustrating the registering method of FIG. 2.

FIG. 3 is an example of a flowchart illustrating the registering method of FIG. 2.

As illustrated in FIG. 3, the registering method of FIG. 2 may include transmitting a signaling message by the mobile terminal 160 in step S310, registering the mobile terminal 160 in a network entry by the authentication server 110 in step S320, transmitting the signaling message to the mobile terminal 160 by the first access router 120 in step S330, transmitting a registration message to the authentication server 110 by the first access router 120 in step S340, and updating an authentication prefix list by the authentication server 110 in step S350.

The above mentioned operations will be described in detail.

In step S310, when the mobile terminal 160 connects to the first access router 120, the mobile terminal 160 may transmit the signaling message to the authentication server 110 via the first access router 120. In step S320, when the authentication server 110 receives the signaling message, the authentication server 110 may register the mobile terminal 160 in a network entry based on the received signaling message.

When the registering of the mobile terminal 160 is completed in the authentication server 110, the first access router 120 may generate a prefix in the mobile terminal 160, and generate a route advertisement (RA) message for allocating the generated prefix to the mobile terminal 160. In step S330, the first access router 120 may transmit the generated RA message to the mobile terminal 160.

When the registering of the mobile terminal 160 is completed in the authentication server 110, the first access router 120 may generate registration information, including the prefix allocated to the mobile terminal 160 by the first access router 120. The method may provide that the registration information includes an ID of the mobile terminal 160, the allocated prefix, and an IP address of the first access router 120.

In step S340, the first access router 120 may generate the registration message for registering the generated registration information, and may transmit the generated registration message to the authentication server 110. In step S350, when the authentication server 110 receives the registration message, the authentication server 110 may update the previously stored prefix list based on the registration information, included in the registration message.

Figure 4:
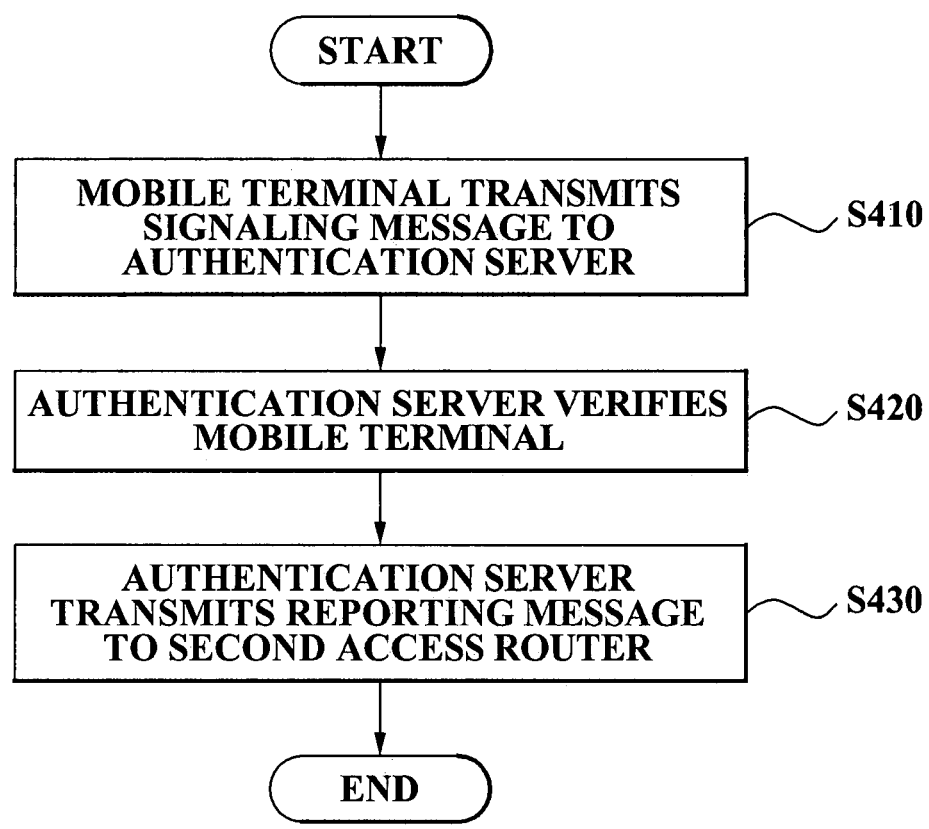
FIG. 4 is an example of a flowchart illustrating a reporting method of FIG. 2.

FIG. 4 is an example of a flowchart illustrating the reporting method of FIG. 2.

As illustrated in FIG. 4, the reporting method of FIG. 2 may include transmitting a signaling message to the authentication server 110 by the mobile terminal 160 in step S410, verifying the mobile terminal by the authentication server 110 in step S420, and transmitting a reporting message to the second access router 130 by the authentication server 110 in step S430.

The reporting method of FIG. 2 will now be described in detail.

In step S410, when the mobile terminal 160 moves from a service area of the first access router 120 to a service area of the second access router 130 and connects to the second access router 120, the mobile terminal 160 may transmit the signaling message to the authentication server 110 via the second access router 130.

In step S420, when the authentication server 110 receives the signaling message, the authentication server 110 may verify whether registration information corresponding to the mobile terminal 160 exists in a previously stored prefix list.

In step S430, when the registration information exists in the previously stored prefix list, the authentication server 110 may generate a reporting message including the registration information, and transmit the generated reporting message to the second access router 130.

Figure 5:
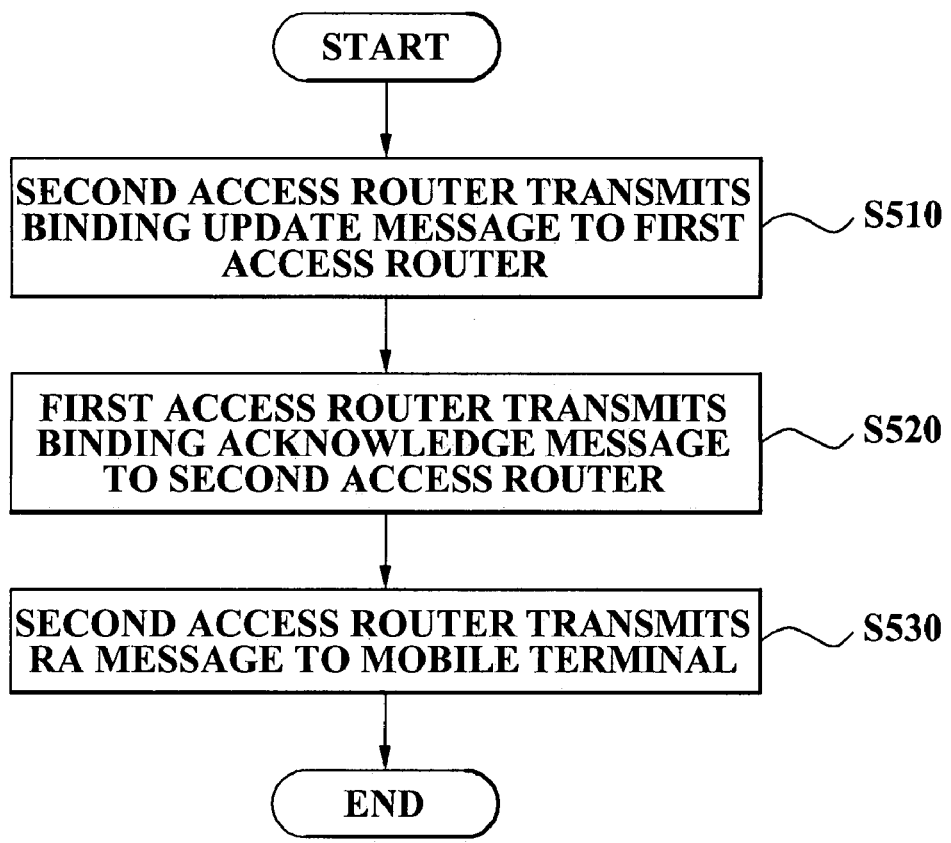
FIG. 5 is an example of a flowchart illustrating a notifying method of FIG. 2.

FIG. 5 is an example of a flowchart illustrating the notifying method of FIG. 2.

As illustrated in FIG. 5, the notifying method of FIG. 2 may include transmitting a binding update message to the first access router 120 by the second access router 130 in step S510, transmitting a binding acknowledge message to the second access router 130 by the first access router 120 in step S520, and transmitting an RA message to the mobile terminal 160 by the second access router 130 in step S530.

The notifying method of FIG. 2 will be described in detail.

In step S510, when the second access router 130 receives the reporting message as a result of the reporting of the verifying of the mobile terminal, the second access router 130 may generate a binding update message based on the registration information, included in the reporting message, and transmit the generated binding update message to the first access router 120.

In step S520, when the first access router 120 receives the binding update message, the first access router 120 may generate a binding acknowledge message, and transmit the generated binding acknowledge message to the second access router 130.

In step S530, when the second access router 130 receives the binding acknowledge message, the second access router 130 may update a previously stored second prefix list, generate an RA message for reporting a use of a prefix allocated by the first access router 120, and transmit the generated RA message to the mobile terminal 160.

Figure 6:
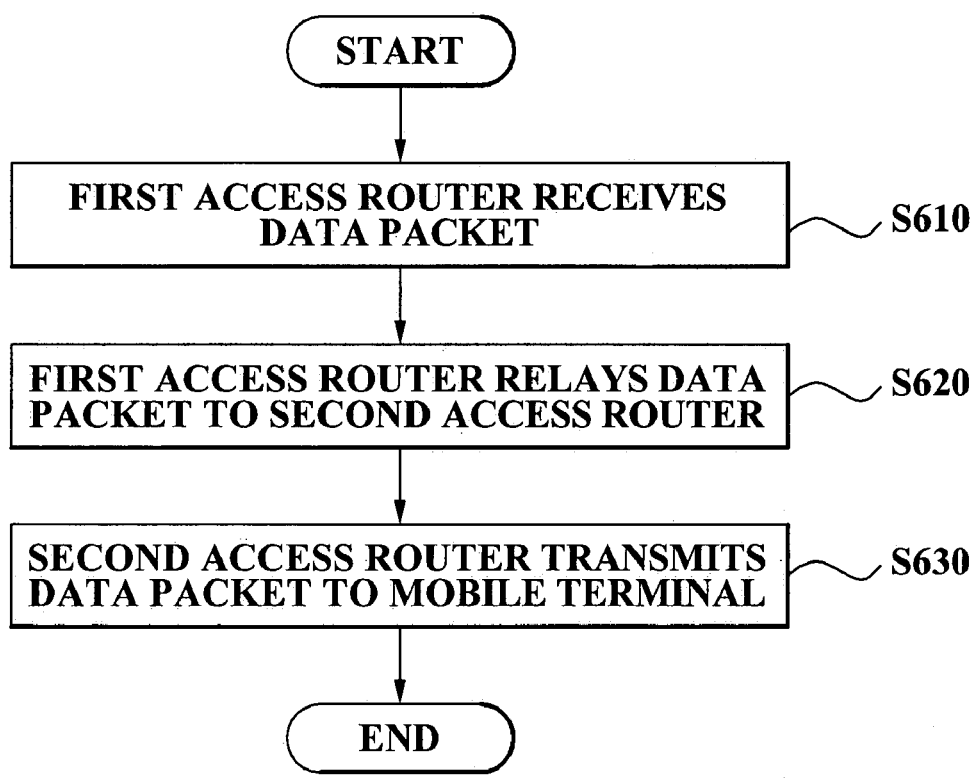
FIG. 6 is an example of a flowchart illustrating a transmitting method of FIG. 2.

FIG. 6 is an example of a flowchart illustrating the transmitting method of FIG. 2.

As illustrated in FIG. 6, the transmitting method of FIG. 2 may include receiving a data packet by the first access router 120 in step S610, relaying the data packet to the second access router by the first access router in step S620, and transmitting the data packet to the mobile terminal 160 by the second access router 130 in step S630.

The transmitting method of FIG. 2 will now be described in detail.

When the first access router 120 receives the data packet having an IP address of the mobile terminal 160 as a destination address in operation S610, the first access router 120 may verify a previously stored first prefix list, and relay the received data packet to the second access router 130 in step S620.

In step S630, when the second access router 130 receives the data packet from the first access router 120, the second access router 130 may verify a previously stored second prefix list, and transmit the received data packet to the mobile terminal 160.

The mobility supporting method, according to a general aspect, may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, magnetic tape, optical media such as CD ROM disks and DVD, magneto-optical media such as optical disks and hardware devices that are specially configured to store and perform program instructions, such as read-only memory (ROM), random access memory (RAM), and flash memory, among others. The media may also be a transmission medium such as optical or metallic lines, and wave guides, among others, including carrier wave transmitting signals specifying the program instructions, and data structures, among others. Examples of program instructions include both machine code, such as that produced by a compiler, and files containing higher level code that may be executed by the computer using an interpreter. The described hardware devices may be configured to function as one or more software modules in order to perform the operations of a general aspect.

As described above, a mobility supporting method and mobility supporting system using the method according to a general aspect can effectively support a mobility of a mobile terminal on a wireless network by allocating, with an access router, a prefix to each of the mobile terminals, and supporting the mobility of the mobile terminal based on the allocated prefix.

While a number of examples have been described above, it will be understood that various modifications may be made. Accordingly, other implementations are within the scope of the following claims.

What is claimed is:

1. A mobility supporting method, the method comprising:
   allocating a prefix to a mobile terminal using a first access router;
   registering the allocated prefix in an authentication server;
   verifying the mobile terminal based on the registered prefix using the authentication server;
   reporting a result of the verifying of the mobile terminal to a second access router; and
   notifying the reported result of the verified mobile terminal to the first access router using the second access router,
   wherein:
      the allocating of the prefix and the registering of the allocated prefix are performed when the mobile terminal connects to the first access router; and
      the verifying of the mobile terminal and the reporting of the result are performed when the mobile terminal connects to the second access router.

2. The method of claim 1, further comprising:
   performing functions of authentication, authorization, and accounting (AAA) using an AAA server, the authentication server including the AAA server.

3. The method of claim 1, further comprising:
   performing a function of a Network Mobility (NEMO) home agent using at least one of the first and second access routers.

4. The method of claim 1, wherein the registering of the allocated prefix in the authentication server comprises:
transmitting, by the mobile terminal, a signaling message to the authentication server via the first access router when the mobile terminal connects to the first access router;
registering, by the authentication server, the mobile terminal in a network entry when the authentication server receives the signaling message;
transmitting, by the first access router, a route advertisement (RA) message to the mobile terminal, the RA message being configured to allocate the prefix to the mobile terminal after the registering of the mobile terminal in the network entry;
transmitting, by the first access router, a registration message to the authentication server, the registration message including registration information and being configured to register the registration information after the transmitting of the RA message, the registration information including the allocated prefix; and
updating, by the authentication server, a previously stored prefix list based on the registration information included in the registration message when the authentication server receives the registration message.

5. The method of claim 4, wherein the registration information further includes an identification (ID) allocated with the prefix of the mobile terminal, the allocated prefix, and an IP address used to allocate a prefix of the first access router.

6. The method of claim 1, wherein the reporting of the result of the verifying of the mobile terminal to the second access router comprises:
transmitting, by the mobile terminal, a signaling message to the authentication server via the second access router when the mobile terminal connects to the second access router;
verifying, by the authentication server, whether registration information corresponding to the mobile terminal exists in a stored prefix list when the authentication server receives the signaling message;
generating, by the authentication server, a reporting message including the registration information; and
transmitting the generated reporting message to the second access router,
wherein the generating of the reporting message and the transmitting of the generated reporting message are performed after the registration information is verified to exist by the authentication server.

7. The method of claim 1, wherein the notifying of the reported result of the verified mobile terminal to the first access router comprises:
generating, by the second access router, a binding update message based on registration information included in a reporting message;
transmitting, by the second access router, the generated binding update message to the first access router;
verifying, by the first access router, a previously stored first prefix list;
generating, by the first access router, a binding acknowledge message to permit a binding list;
transmitting, by the first access router, the generated binding acknowledge message to the second access router;
updating, by the second access router, a previously stored second prefix list; and
transmitting, by the second access router, a route advertisement (RA) message to the mobile terminal, the RA message being configured to report a use of the allocated prefix to the mobile terminal,
wherein:
the generating of the binding update message and the transmitting of the generated binding update message are performed after the reporting of the result of the verifying of the mobile terminal to the second access router;
the verifying of the previously stored first prefix list, the generating of the binding acknowledge message, and the transmitting of the generating binding acknowledge message are performed when the generated binding updated message is received by the first access router; and
the updating of the previously stored second prefix list and the transmitting of the RA message are performed when the generated binding acknowledge message is received by the second access router.

8. The method of claim 1, further comprising:
transmitting, by the first access router, a data packet to the second access router when the first access router receives the data packet, the data packet including an IP address of the mobile terminal as a destination address;
receiving, by the second access router, the data packet; and
transmitting the received data packet to the mobile terminal.

9. A non-transitory computer-readable storage medium storing a program for implementing a mobility supporting method, the method comprising:
allocating a prefix to a mobile terminal using a first access router;
registering the allocated prefix in an authentication server;
verifying the mobile terminal based on the registered prefix using the authentication server;
reporting a result of the verifying of the mobile terminal to a second access router; and
notifying the reported result of the verified mobile terminal to the first access router using the second access router,
wherein:
the allocating of the prefix and the registering of the allocated prefix are performed when the mobile terminal connects to the first access router; and
the verifying of the mobile terminal and the reporting of the result are performed when the mobile terminal connects to the second access router.

10. A mobility supporting system, comprising:
an authentication server configured to store and manage registration information corresponding to a mobile terminal, an authentication prefix list comprising the registration information;
a first access router configured to allocate a prefix to the mobile terminal and register the allocated prefix in the authentication server, the allocation of the prefix and the registering of the allocated prefix being performed when the mobile terminal connects to the first access router; and
a second access router configured to verify the mobile terminal via the authentication server and report a connection of the mobile terminal to the first access router.

11. The system of claim 10, wherein the authentication server comprises an authentication, authorization, and accounting (AAA) server configured to perform functions of authentication, authorization, and accounting.

12. The system of claim 10, wherein at least one of the first and second access routers is further configured to perform a function of a Network Mobility (NEMO) home agent.

13. The system of claim 10, wherein the first access router is further configured to:

transmit a route advertisement (RA) message when the mobile terminal connects to the first access router, the RA message being configured to allocate the prefix to the mobile terminal; and transmit a registration message after the transmitting of the RA message is complete, the registration message being configured to register the registration information to the authentication server, the registration message comprising the registration information, the registration information comprising the allocated prefix.

14. The system of claim 13, wherein the authentication server is further configured to update the authentication prefix list based on the registration information of the registration message when the registration message is received by the authentication server.

15. The system of claim 13, wherein the registration information further comprises:
an identification (ID) allocated with the prefix of the mobile terminal;
the allocated prefix; and
an IP address configured to allocate a prefix of the first access router.

16. The system of claim 10, wherein the authentication server is further configured to:
verify whether the registration information corresponding to the mobile terminal exists in the authentication prefix list when the mobile terminal connects to the second access router;
generate a reporting message comprising the registration information; and
transmit the generated reporting message to the second access router,
wherein the authentication server is further configured to generate the reporting message and transmit the generated reporting message after the registration information is verified to exist by the authentication server.

17. The system of claim 16, wherein the second access router is further configured to:
generate a binding update message based on the registration information of the reporting message;
transmit the generated binding update message to the first access router;
update a previously stored second prefix list; and
transmit a route advertisement (RA) message configured to report a use of the allocated prefix to the mobile terminal,
wherein the second access router is further configured to:
generate the binding update message and transmit the generated binding update message when the reporting message is received from the authentication server; and
update the previously stored second prefix list and transmit the RA message when a binding acknowledge message is received by the second access router in response to the binding update message from the second access router.

18. The system of claim 17, wherein, when the binding update message is received by the first access router, the first access router is further configured to:
verify a previously stored first prefix list;
generate the binding acknowledge message configured to permit a binding; and
transmit the generated binding acknowledge message to the second access router.

19. The system of claim 10, wherein, when the first access router receives a data packet comprising an IP address of the mobile terminal as a destination address:
the first access router is further configured to transmit the data packet to the second access router; and
the second access router is further configured to receive the data packet and transmit the received data packet to the mobile terminal.

20. The system of claim 10, wherein the mobile terminal comprises any of a mobile communication terminal, a public switched telephone network (PSTN) terminal, a voice over Internet protocol (VoIP) terminal, a session initiation protocol (SIP) terminal, a media gateway control (Megaco) terminal, a personal digital assistant (PDA), a mobile phone, a personal communication service (PCS) phone, a hand-held personal computer (PC), a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, and a satellite/terrestrial Digital Multimedia Broadcasting (DMB) phone.

* * * * *